United States Patent [19]
Scholl et al.

[11] Patent Number: 6,065,180
[45] Date of Patent: May 23, 2000

[54] RELEASEABLE WIPER ARM-WIPER BLADE CONNECTION ON A VEHICLE WINDSHIELD WIPER

[75] Inventors: Wolfgang Scholl, Gemmrigheim; Eckhardt Schmid, Brackenheim; Bruno Egner-Walter, Heilbronn, all of Germany

[73] Assignee: ITT Manufacturing Enterprises, Inc., Wilmington, Del.

[21] Appl. No.: 09/029,876

[22] PCT Filed: Jun. 29, 1996

[86] PCT No.: PCT/EP96/02853

§ 371 Date: May 14, 1998

§ 102(e) Date: May 14, 1998

[87] PCT Pub. No.: WO97/09210

PCT Pub. Date: Mar. 13, 1997

[30] Foreign Application Priority Data

Sep. 7, 1995 [DE] Germany .......................... 195 33 030

[51] Int. Cl.[7] ...................................................... B60S 1/40
[52] U.S. Cl. ........................................................ 15/250.32
[58] Field of Search ........................... 15/250.32, 250.31, 15/250.351, 250.43, 250.361

[56] References Cited

U.S. PATENT DOCUMENTS

| 1,445,473 | 2/1923 | Beagle | 15/250.32 |
|---|---|---|---|
| 2,852,796 | 9/1958 | Leins | 15/250.32 |
| 3,131,414 | 5/1964 | Wise | 15/250.32 |
| 3,670,355 | 6/1972 | Sakamoto | 15/250.32 |
| 3,837,033 | 9/1974 | Van den Berg et al. | 15/250.32 |
| 4,296,521 | 10/1981 | Mower | 15/250.32 |
| 4,354,293 | 10/1982 | La Sausse et al. | 15/250.32 |
| 5,291,627 | 3/1994 | Liou | 15/250.32 |
| 5,392,487 | 2/1995 | Yang | 15/250.32 |

FOREIGN PATENT DOCUMENTS

| 2133340 | 11/1972 | France . |
|---|---|---|
| 2105773 | 12/1971 | Germany . |
| 2816206 | 10/1979 | Germany . |
| 1100069 | 1/1968 | United Kingdom . |

*Primary Examiner*—Gary K. Graham
*Attorney, Agent, or Firm*—J. Gordon Lewis

[57] ABSTRACT

A connection between a wiper arm and the bracket of a wiper blade that is easy to manipulate during wiper blade changes but nevertheless is a secure rotatable connection, for a wiper blade in which a connector is provided on the wiper arm or the wiper rod, is achieved as follows; the connector has a through-hole with inside thread; the through-hole is placed concentrically to a geometric axis running transversely; a screw serving as the hinge pin is screwed into the through-hole, and in this way a releasable frictional engagement between the screw and the connector is created. The screw is fitted on its opposite ends with cylindrical bearing segments which protrude laterally out of the through-hole of the connector and are mounted rotatably in the respective bearing holes in the side walls of he connecting segment of the wiper blade bracket.

15 Claims, 2 Drawing Sheets

RELEASEABLE WIPER ARM-WIPER BLADE CONNECTION ON A VEHICLE WINDSHIELD WIPER

BACKGROUND OF THE INVENTION

The invention relates to a connection of a wiper arm and a wiper blade for an automotive windshield wiper in which the wiper blade has a bracket for guiding a wiper strip, and this bracket in turn has a connecting segment for a pivoting connection with a hooked curved wiper arm end. The hooked wiper arm end extends around a connector and can be connected to this, e.g., by snap lock action. The connector is mounted to pivot on a hinge pin, which extends across between two parallel side walls that are spaced a distance apart on the bracket of the wiper blade, forming the connecting segment of the bracket.

Such wiper arm-wiper blade connections, which are known from German Patent DE-AS 2,515,388, European Patent EP 455,520 A1 or German Patent DE 36 18 326 C2, for example, have a significant disadvantage in that it is difficult and sometimes complicated to replace a wiper blade. To do so, the wiper blade must be twisted with respect to the wiper arm out of its working position, the wiper blade must then be shifted in the longitudinal direction of the wiper arm to detach the connector from the wiper arm or to link it to the arm, and the connector must then be removed from the hinge pin possibly by turning again, or locked onto the hinge pin, depending on the specific embodiment. This can lead to a situation where a driver postpones changing the wiper blade, although it is actually necessary, and this is often even more difficult when the wiper arm is attached to the vehicle.

Wiper arm-wiper blade connections are already known in which a connector attached to a hooked end of the wiper arm can be inserted from above into the connecting segment of the wiper-blade bracket and can be locked onto the hinge pin. Such a solution, which is known from European Patent EP 319,161 A1, for example, does permit easier handling when changing wiper blades, but here there is a danger that, especially after repeated wiper blade replacements, the snap connection between the connector and the bracket has worn out and no longer guarantees a sufficiently secure connection. When the wiper arm is swung out away from the windshield, e.g., for cleaning the windshield, the wiper blade may fall off the wiper arm.

The object of the invention is to improve on a wiper arm-wiper blade connection of the type described in the introduction, so as to guarantee simple handling when changing wiper blades and also to guarantee a secure connection between the wiper arm and the wiper blade.

SUMMARY OF THE INVENTION

The object is achieved by a detachable wiper arm-wiper blade connection with the following features:

The wiper blade to be mounted on the wiper arm has a bracket with a connecting segment for a pivoting connection to a connector provided on the wiper arm. The connecting segment of the bracket is formed by first and second side walls which are spaced at spacings and are parallel to each other. The connector on the wiper arm is to be mounted between the two side walls of the connecting segment so it can rotate along a geometric axis running across the two side walls of the connecting segment, and the connector is connected to the bracket. The connector has a through-hole coaxial with the geometric axis. The first side wall of the connecting segment has a first through-hole coaxial with the geometric axis, and the second side wall has a second hole coaxial with the geometric axis. This second hole in the second side wall may be a through-hole which is produced easily. It can also be designed as a blind hole, so that the visible outside of the second side wall of the connecting segment is closed. A screw serving as the hinge pin is pushed through the first through-hole in the first side wall and arranged in the through-hole of the connector in such a way that the bracket can rotate about the geometric axis relative to the wiper arm.

The wiper arm-wiper blade connection is designed to permit simple handling when changing wiper blades. To change the blade, one need only unscrew and remove the screw which serves as the hinge pin. Then the wiper blade can be removed from above or below from the connector held on the wiper arm. The direction of removal of the wiper blade from the connector here depends on whether the connector enters the connecting segment of the bracket from above or below. The new wiper blade is mounted in the opposite direction with its connecting segment on the connector, and the through-hole of the connector situated between the side walls of the connecting segment is coaxially aligned with the bearing holes in the side walls of the connecting segment. Now the hinge pin is inserted coaxially into the first through-hole and the second hole of the connecting segment as well as the through-hole of the connector and then screwed tightly to either the connector or the bracket.

According to an advantageous embodiment of the invention the through-hole of the connector has an inside thread, and the first through-hole and the second hole in the connecting segment of the bracket are designed as bearing holes. On its opposite ends, the screw, which is designed as a hinge pin, has first and second cylindrical bearing segments with which it is mounted on the bracket so it can rotate in the bearing holes of the connecting segment. In addition, the screw with a threaded section located between the first and the second cylindrical bearing segments is screwed into the through-hole of the connector so that there is a releasable frictional engagement between the screw and the connector attached to the wiper arm. The bracket of the wiper blade can rotate here about the screw which has been screwed into the connector. The frictional engagement, which can be released by unscrewing the screw, must in this case be great enough that it cannot be released by the frictional forces arising between the two bearing holes of the connecting segment and the two cylindrical bearing segments of the screw.

Such a friction closure between the screw serving as the hinge pin and the connector mounted on the wiper arm can be achieved by the fact that the first cylindrical bearing segment of the screw has a larger diameter than the through-hole in the connector, and the respective first bearing hole in the connecting segment of the bracket has a correspondingly large diameter. This yields the following result: the inner axial face side, facing the connector, of the first cylindrical connecting segment of the screw is frictionally engaged with the outside of the connector when the screw is screwed into the connector. Care must be taken here that there is no frictional connection between the bracket and the screw or the connector, so that the require rotatability of the connector and screw with respect to the bracket of the wiper blade is maintained.

If the screw serving as the hinge pin has a screw head on its end with the first cylindrical bearing segment and if this screw head is advantageously designed with a coin slot, the required mobility of the connector and screw with respect to the bracket of the wiper blade is guaranteed by the fact that the axial length of the first cylindrical bearing segment of the screw is as large as or slightly larger than the thickness of the first side wall of the connecting segment.

Especially when the possibility of unscrewing or screwing in the screw with the aid of a coin is to be waived to eliminate the screw head on the outside of the bracket, which might be disturbing, an advantageous embodiment is recommended, according to which the diameter of the through-hole in the connector and also that of the shaft of the screw are reduced in incremental steps. The releasable frictional engagement between the connector and the screw is formed here by the fact that the step of the screw with its axial front face is frictionally engaged with the corresponding axial front face of the step of the through-hole of the connector. The thread of the fastening screw and the through-hole of the connector can thereby optionally be placed in a section with larger diameter or in a section with smaller diameter. It seems to be advantageous, however, to create the thread in a section having a larger diameter. In addition, when this variant is used, it is recommended that the diameter of the first cylindrical bearing segment of the screw again be made at least slightly larger than the outside diameter of the threaded segment of the screw which serves as a hinge pin.

Another advantageous embodiment of the invention provides that the through-hole in the connector be designed as bearing hole from a corresponding central cylindrical bearing segment of the screw which serves as a hinge pin. The screw itself is provided on its front end with a threaded segment that can be screwed into the second hole of the connecting segment on the bracket in such a way as to form a sufficiently strong, releasable frictional engagement between the screw and the bracket of the wiper blade. In this case, the wiper arm-wiper blade connection is designed so that the screw mounted in the through-hole of the connector can rotate together with the bracket. The releasable frictional engagement between screw and bracket can be achieved in an advantageous manner as follows: the diameter of the threaded segment of the screw screwed into the second hole of the connecting segment is smaller than the diameter of its cylindrical bearing segment. The front face of the cylindrical bearing segment of the screw here fits force-engaged against the inside of the second side wall of the connecting segment of the bracket; the second hole with the inside thread is located here. If this second hole is designed as a blind hole, the forward front face of the screw can be force-engaged to the base of this hole.

A further embodiment has, along with the advantageous slot in the screw head, the additional advantages that the screw serving as the hinge pin additionally fixes the first and second side walls of the connecting segment of the bracket at their prescribed distance from one another and prevents lateral deflection of these side walls. This leads to better lateral guidance of the connector in the connecting segment or of the wiper blade on the wiper arm, and this improves the wiping quality.

An advantageous embodiment provides that the connector be a separately prefabricated piece which, in the manner of the known connectors, is connected with the hooked folded end of a wiper rod, preferably with a snap lock. This variant is especially advantageous when the connector is designed so that it can be connected to various types of hooked wiper arms available on the market.

Another embodiment provides that the connector be integrally cast directly on the wiper rod of a wiper arm or injection molded onto it. This results in a durable secure one-piece connection of the wiper arm and the connector. The special advantage is that in this case there is no necessity to connect the connector to the wiper arm, as a separate part in a separate manipulation, or to remove the connector from the wiper arm during the change. Here we should point out that when this variant is used, the free end of the wiper rod need not necessarily be curved in a hook shape, because when the connector is injection molded onto the wiper rod, a stable connection between the wiper rod and the connector is achieved in any case.

In an advantageous embodiment, the connector has lateral guide walls in a known fashion, and these walls can bridge or fill up the side spacings between the wiper rod and the first and second side walls of the connecting segment of the bracket. In this way, when the windshield wiper is operated, good lateral guidance of the bracket or the wiper blade on the wiper arm is achieved. In a known manner, these lateral guide walls may also be equipped with resilient side sections which are suitable for equalizing a lateral play, caused by tolerances, between the side walls of the connecting segment and the wiper rod.

Especially in cases where a wiper arm made of plastic is to be connected to a wiper blade whose bracket system is preferably also made of plastic, an advantageous embodiment is recommended, where the connector is manufactured in one piece with the wiper arm.

Other advantages and details of the invention are described in more detail in the following embodiments.

DETAILED DESCRIPTION OF THE DRAWINGS

Figure 1:
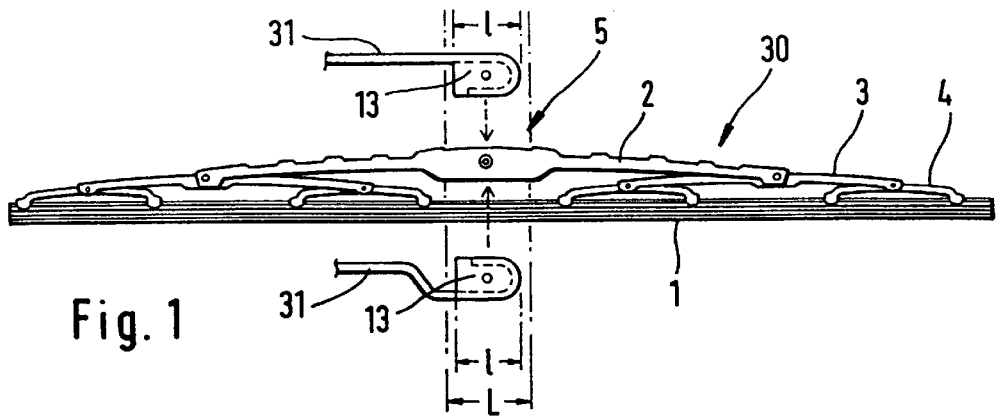
FIG. 1: A side view of a wiper blade.

FIG. 1 shows a wiper blade 30 of an automotive windshield wiper, where a rubber wiper strip 1 is held and guided by a bracket system. The bracket system consists of a bracket 2, two intermediate brackets 3, and four claw holders 4, and where the intermediate holders 3 are connected rotatably to the bracket 2, and the claw holders 4 are connected rotatably to the intermediate holders 3. In the operating state on the vehicle, wiper strip 1 lies against the windshield to be wiped; accordingly, in the description the side or direction of the wiper blade 30 on which the wiper strip 1 is located is designated as "below" and the side or direction of the wiper blade 30 on which the bracket is located is designated "above." Approximately in the middle with respect to the lengthwise extent of the bracket 2, a connecting segment 5 is provided on this bracket; this segment is for the pivoting connection of the wiper blade 30 with wiper arm 31 of an automotive windshield wiper. The detachable wiper arm-wiper blade connection to be manufactured is to be constructed so that the wiper blade 30 can rotate relative to the wiper arm 31 around a geometric axis 6 running across wiper blade 30 or bracket 2 (FIG. 2).

Figure 2:
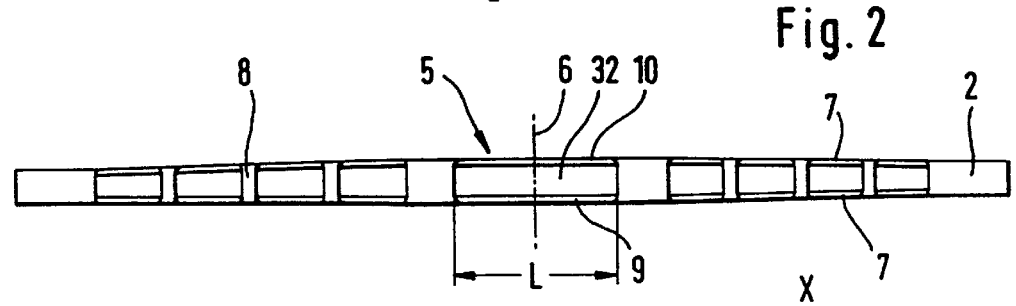
FIG. 2: A top view of a bracket of a wiper blade, enlarged in comparison with FIG. 1.

FIG. 2 shows that the bracket 2 of the wiper blade 30 is essentially formed from two side walls 7, which are connected to each other by a back 8 with multiple passages. The connecting segment 5 of bracket 2 is formed from a first side wall 9 and a second side wall 10, which are also parts of side walls 7 of bracket 2. The first and the second side walls 9 and 10 are arranged with a certain spacing between them and parallel to one another. The connecting segment 5 of the bracket 2 is thus open at the top and bottom. Furthermore, FIG. 2 shows that the aforementioned geometric axis 6 runs across the first and second side walls 9 and 10 of the connecting segment 5.

FIG. 1 also shows that to manufacture the wiper arm-wiper blade connection according to the design of the wiper arm 31 equipped with connector 13, the wiper arm end with connector 13 is inserted into the fastening segment 5 of the bracket 2 vertically from above or from below in the direction of the dotted arrow. Because of the use of screw 19, which is designed as a hinge pin, in the manufacture of the wiper arm-wiper blade connection, no rotation of the wiper blade 30 to the wiper arm 31 is required (as for the known wiper arm-wiper blade connections described above), the length L of the opening 32 in the back 8 of the bracket 2 or the length L of the connecting segment 5 can therefore be kept very small in adaptation to the length l of the wiper arm end fitted with the connector 13. Because of the method of introducing connector 13 from above or from below into the connecting segment 5 without additional rotation, length L need be only slightly greater than length l. This yields better wiping performance because of improved lateral guidance of wiper blade 30 at connector 13.

Figure 3:
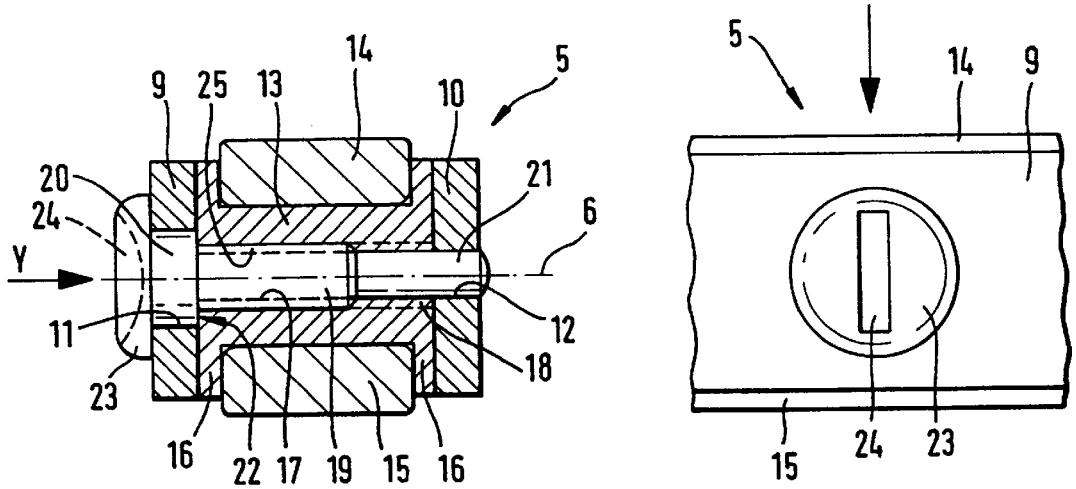
FIG. 3: An enlarged sectional view of an embodiment of a wiper arm-wiper blade connection according to the invention.
Figure 4:
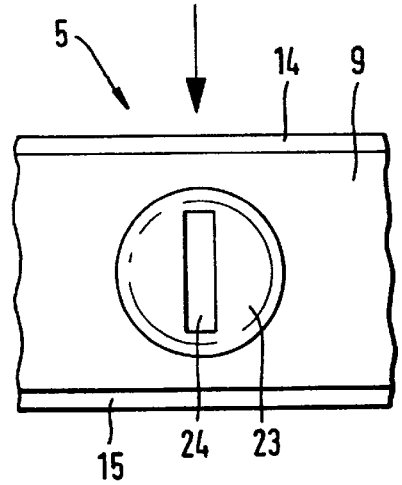
FIG. 4: A side view of the wiper arm-wiper blade connection according to FIG. 3 in the direction of the arrow Y.
Figure 5:
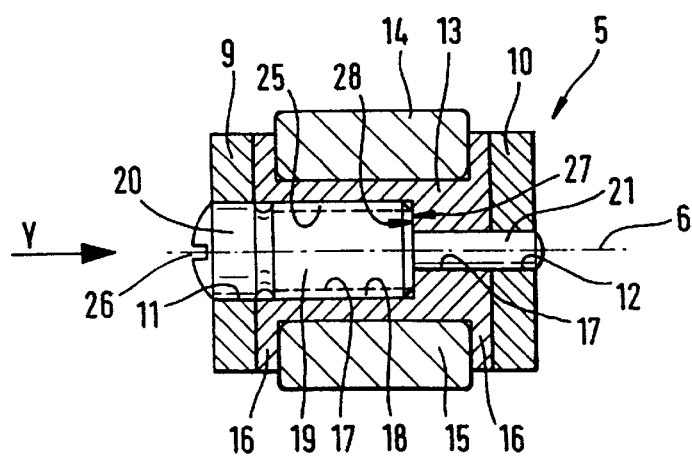
FIG. 5: Sectional view of another embodiment of a wiper arm-wiper blade connection according to the invention.

Significant details of the detachable wiper arm-wiper blade connection can be seen in FIGS. 3 through 5.

In FIG. 3, the first side wall 9 and the second side wall 10 of the connecting segment 5 are shown. The first side wall 9 has a larger first bearing hole 11, which penetrates the first side wall 9. A second bearing hole 12 with smaller diameter penetrates the second side wall 10 of the connecting segment 5. Both bearing holes 11 and 12 are coaxial with the geometric axis 6.

Between the two side walls 9 and 10 of the connecting segment 5 a connector is introduced, arranged in a known way on the end, which is curved into a U-shaped hook, of the wiper rod 14 and held there. In the present case, the hooked end of wiper rod 14 reaches around connector 13 so that the angle arm formed by wiper rod 14 fits against the upper side of connector 13 and the curved angle arm 15 fits against the under side of connector 13. Connector 13 is also fitted with lateral guide walls 16, which on one side lie against the flanks of wiper rod 14 or of leg 15 and on the other side lie against the inside surface of the first or the second side wall 9 or 10 of the connecting segment 5, and thus guarantee a good lateral guidance of the wiper blade on the wiper arm. To compensate for play due to tolerances, guide walls 16 may also be equipped with resilient, elastic areas.

FIG. 3 also shows that connector 13 has a through-hole 17 with an inside thread 18 which is coaxial with geometric axis 6. The diameter of this through-hole 17 of connector 13 is smaller than the first bearing hole 11 in the first side wall 9. The diameter of the second bearing hole 12 in the second side wall 10 corresponds to the diameter of the through-hole of connector 13. However, the diameter of bearing hole 12 can also be smaller than the diameter of through-hole 17. A screw 19 serves as hinge pin of the detachable wiper arm-wiper blade connection, and this is also arranged coaxial with geometric axis 6 and is tightly screwed into through-hole 17 of the connector. Screw 19 is longer than the width of connector 13. It has a first cylindrical bearing segment 20 and a second cylindrical bearing segment 21 provided on the opposite ends of screw 19. After connector 13 fixed to wiper rod 14 has been placed in the connecting segment 5 of the bracket 2 in the direction of the arrow X (FIG. 4) and aligned coaxially with the axis 6, screw 19 is screwed into through-hole 17 of the connector 13 in the direction of arrow Y through the first bearing hole. The first and second cylindrical bearing segments 20 and 21 thus protrude on the opposite sides of connector 13 out of the through-hole 17 and are rotatably situated in the respective first bearing hole 11 or second bearing hole 12. It is obvious that the diameter of the first bearing segment 20 of screw 19 is adapted to the diameter of the first bearing hole 11 and the second bearing segment 21 of screw 19 is adapted to the diameter of the second bearing hole 12. Here it is also important that the axial length of the first cylindrical bearing segment 20 is at least slightly greater than the thickness of the first side wall 9 in the area of the connecting segment 5 of the bracket 2. This guarantees that by tightly screwing screw 19 into bearing hole 17 of connector 13, a releasable frictional engagement is created between screw 19 and connector 13, in that the inward pointing axial front face 22 is pressed against the outside of the connector 13. Thus, screw 19, together with connector 13 and wiper rod 14, can rotate relative to the bracket 2 around the geometric axis 6. Bearing segments 20 and 21 of screw 19 thus turn in bearing holes 11 and 12. Although screw 19 has a screw head on the outside of the first side wall 9 of connecting segment 5, because of the axial length of the first bearing segment 20 of screw 19, which is slightly longer than the thickness of the first side wall 9, the requisite mobility between bracket 2 and connector 13 with the screw is guaranteed.

FIG. 4 also shows in particular that screw head 23 has a so-called coin slot 24 which makes it possible to loosen or fasten the screw with a coin, i.e., without a special tool.

To replace the wiper blade, first of all, screw 19 is loosened and removed from connecting segment 5 in the direction of arrow Y. Now the structural unit formed by the connector attached to wiper rod 14 is removed from connecting segment 5 of bracket 2 in the direction opposite arrow X (FIG. 4). In the bracket 2 of the new wiper blade, the connector 13 fastened onto the wiper rod 14 is pushed in the direction of arrow X. i.e., from above, into the connecting segment 5 and is directed at least approximately coaxially with the geometric axis 6. Then screw 19 serving as the hinge pin is guided in the direction of arrow Y through the first bearing hole 11 and screwed tightly into through-hole 17 of connector 13, so that it has the position shown ir FIG. 3 and the frictional engagement between screw 19 and connector 13 is so great that it cannot be released by the frictional forces acting between screw 19 and connecting segment 5 of bracket 2. It is advantageous for simple and rapid changing of the wiper blade if inside thread 18 and the respective thread 25 of screw 19 have a relatively large pitch.

In the embodiment according to FIG. 5 of a wiper arm-wiper blade connection according to the invention, screw 19 serving as the hinge pin does not have a screw head; instead there is an appropriate slot 26 or a similar means for applying a common tool in the front face of the end of screw 19 which is assigned to the first cylindrical bearing segment 20. Like the embodiment in FIG. 3, in this case screw 19 is again screwed into a through-hole 17 of connector 13 and brought into a releasable frictional engagement with connector 13. The ends of screw 19 protruding from connector 13 on both sides are designed as first cylindrical bearing segment 20 and second cylindrical bearing segment 21, and are rotatably mounted in a corresponding first bearing hole 11 in the first side wall 9 or in a second bearing hole 12 in the second side wall 10 of connecting segment 5 of bracket 2. Connector 13, which is in turn inserted in a known manner into the area between wiper rod 14 and arm 15 (this arm is bent into a U-shaped hook) and fixed there, is also arranged coaxially with geometric axis 6, like screw 19.

The special feature of the embodiment is that screw 19 and accordingly the through-hole 17 of connector 13 are reduced in diameter in stepwise fashion. The releasable force-engaged connection between screw 19 and connector 13 is established by virtue of the fact that the axial front face 27 of the step on screw 19 is pressed against the axial front face 28 of the step in the continuous hole 17 of connector 13 due to the fact that the screw is tightened down. The inside thread 18 of through-hole 17 of connector 13 and thread 25 of screw 19 are located in the corresponding part of through-hole 17 or of screw 19 with the larger diameter. Such a thread can absorb relatively large forces without damage. It would also be possible, however, to provide inside thread 18 or thread 25 on the part of the through-hole 17 or screw 19 which has the smaller diameter. In the latter case, the strength of this thread can be increased as follows: the axial length of the parts with a smaller diameter is lengthened at the expense of the parts with a larger diameter.

Handling of the wiper arm-wiper blade connection according to FIG. 5 when changing wiper blades is, in principle, the same as for the embodiment according to FIG. 3. Therefore, we shall refrain from repeating the description of how to change a wiper blade. In the case of FIG. 5 it is of course necessary to use a suitable screwdriver or a similar tool. Also, with the embodiment according to FIG. 5, it would be possible for the hook of wiper rod 14 to be curved up in a U shape and for connector 13 with wiper rod 14 to be inserted from below into fastening segment 5 of the bracket 2 of a wiper blade.

It should be pointed out that in the embodiments according to FIGS. 3 or FIG. 5, the bracket 2, and thus the first and second side walls 9 and 10 of connecting segment 5 can be made of metal or plastic. If bracket 2 is made of metal, it is advisable to use a plastic screw 19 for the hinge pin. If a metal screw is used, additional plastic bushings would be necessary between bearing holes 11 and 12 and the respective bearing segments 20 and 21 in order to form a suitable wear-resistant and low-noise friction bearing. If, on the other hand, the bracket 2 of the wiper blade is made of plastic, it does not matter whether screw 19 serving as the hinge pin is made of plastic or metal. A plastic screw 19 has the advantage that it is lighter and can be produced less expensively. A metal screw 19, however, would have the advantage of greater inherent stability and durability.

Figure 6:
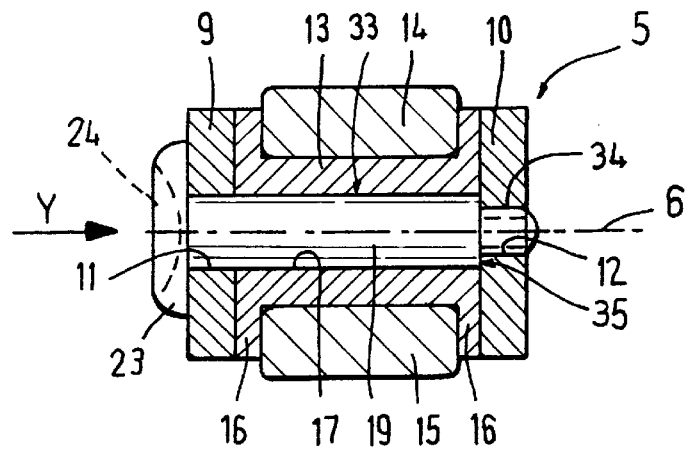
FIG. 6: Sectional view of another embodiment of a wiper arm-wiper blade connection according to the invention.

In the embodiment of the wiper arm-wiper blade connection in FIG. 6, through-hole 17 in connector 13 is manufactured as a bearing hole, so that screw 19 serving as the hinge pin is mounted so it can rotate in this though-hole 17 with a central cylindrical bearing segment 33. In addition, screw 19 passes through the first through-hole 11 in the first side wall 9 of connecting segment 5 and, with a threaded segment 34 provided on its forward end, it is screwed tightly into the second hole 12 (which is designed with an inside thread) in the second side wall 10 of connecting segment 5. The required strong but releasable frictional engagement between screw 19 and bracket 2 is achieved by the force-engaged contact of front face 35 of cylindrical bearing segment 33 of screw 19 on the inside of the second side wall 10 of connecting segment 5. Front face 35 is designed so that the diameter of threaded segment 34 is smaller than the diameter of central cylindrical bearing segment 33 of screw 19.

The length of the region of screw 19 between the underside of the screw head 23 provided with slot 24 and front face 35 of bearing segment 33 corresponds to the thickness of connector 13 plus the thickness of side wall 9. Thus, screw head 23 lies against the outside of the first side wall 9, so that the spacing between the first and second side walls 9 and 10 is additionally fixed by screw 19. This yields improved lateral guidance of wiper blade 30 on connector 13 and wiper arm 33; but care must be taken that no frictional engagement is generated here by screw 19 between connector 13 and the first and second side walls 9 and 10.

Handling of this wiper arm-wiper blade connection is the same as for the embodiment according to FIG. 3; therefore, reference is made to the respective description for this embodiment.

Figure 7:
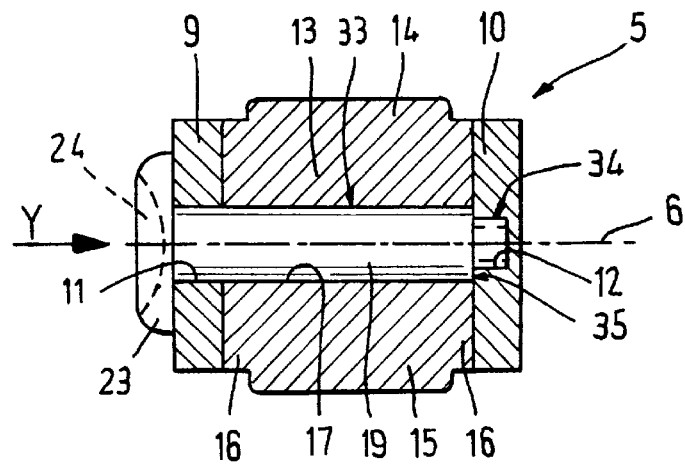
FIG. 7: Sectional view of another embodiment of a wiper arm-wiper blade connection according to the invention.
Figure 8:
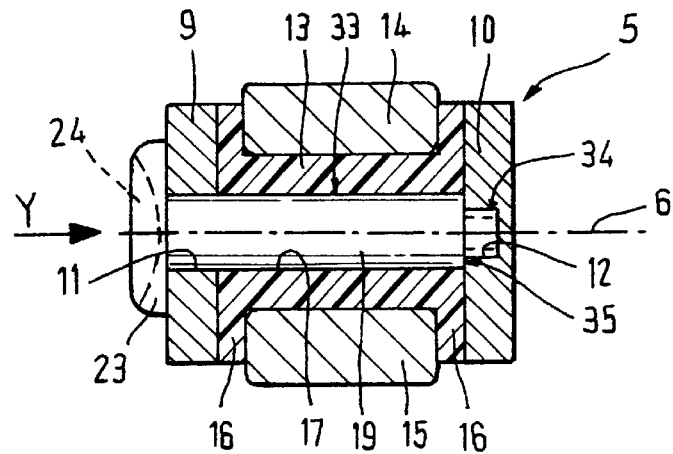
FIG. 8: Sectional view of another embodiment of a wiper-wiper blade connection according to the invention.

Referring now to FIGS. 7 and 8, the connector 13 can be cast in one piece with a wiper rod, or the connector 13 can be molded onto a wiper rod, or the wiper arm can be made of plastic and the connector 13 can be made in one piece with the wiper arm end. A connector 13 can be provided on a wiper arm and arranged in the connecting segment of the bracket between the two side walls to rotate relative to the bracket around a geometric axis running transverse to the two side walls and connected to the bracket. The connector 13 can have a through-aperture arranged coaxially with the geometric axis. The first wall of the connecting segment can have a first aperture coaxial with the geometric axis, and the second side wall of the connecting segment can have a second aperture coaxial with the geometric axis. The second aperture in the second side wall of the connecting segment can be designed as a blind aperture as illustrated in FIGS. 7 and 8, and can be closed on the outside of the second wall. The hinge pin can be arranged in the through-aperture of the connector 13 in such a fashion that the bracket can be rotated about the geometric axis relative to the wiper arm.

KEY TO NUMBERS IN FIGURES

1. Wiper rod
2. Bracket
3. Intermediate holder
4. Claw holder
5. Connecting segment
6. (Geometric) axis
7. Side wall
8. Back
9. First side wall
10. Second side wall
11. First through-hole
12. Second hole
13. Connector
14. Wiper rod
15. Leg
16. Guide wall
17. Through-hole
18. Inside thread 19. Screw
20. First (cylindrical) bearing segment
21. Second (cylindrical) bearing segment
22. Front face
23. Screw head
24. Slot
25. Thread
26. Slot
27. Front face
28. Front face
30. Wiper blade
31. Wiper arm
32. Opening
33. Bearing segment
34. Threaded segment
35. Front face
X Arrow
Y Arrow

What is claimed is:

1. A wiper assembly comprising:

a wiper bracket having a connecting segment for a pivoting connection with a wiper arm end, the connecting segment formed by a first side wall and a second side wall at a distance from and parallel to the first side wall;

a connector provided on a wiper arm and arranged in the connecting segment of the bracket between the two side walls to rotate relative to the bracket around a geometric axis running transverse to the two side walls and connected to the bracket, the connector having a through-aperture arranged coaxially with the geometric axis, the first side wall of the connecting segment having a first aperture coaxial with the geometric axis, and the second side wall of the connecting segment having a second aperture coaxial with the geometric axis, the through-aperture of the connector having an inside thread, the first through-aperture and the second aperture of the connecting segment of the bracket designed as bearing apertures; and a hinge pin arranged in the through-aperture of the connector in such a fashion that the bracket can be rotated about the geometric axis relative to the wiper arm, the hinge pin including a screw with a first cylindrical bearing segment and a second cylindrical bearing segment for mounting in the corresponding bearing apertures of the connecting segment, and the screw screwed into the through-aperture of the connector with a threaded segment provided between the bearing segments in such a way as to yield a releasable frictional engagement between the screw and the connector, the frictional engagement being sufficiently secure to resist being released by frictional forces acting during rotation of the bracket relative to the wiper arm end.

2. The wiper assembly of claim 1, wherein the first through-aperture of the connecting segment and the corresponding first cylindrical bearing segment of the screw have a larger diameter than the through-aperture in the connector.

3. The wiper assembly of claim 1, wherein the through-aperture in the connector and the corresponding shaft of the screw each diminish in diameter by at least one step and the at least one step of the screw lies force-engaged against the at least one step of the through-aperture of the connector.

4. The wiper assembly of claim 1, wherein the screw has a head on the outside of the first side wall of the connecting segment, and the axial length of the first bearing segment of the screw is at least as long as the thickness of the first side wall of the connecting segment.

5. The wiper assembly of claim 1, wherein the inside thread in the through-aperture of the connector and the respective thread of the screw have a large pitch.

6. The wiper assembly of claim 1, wherein the connector is a separately manufactured component of plastic and inserted into an area formed by an end of a wiper rod bent in a U-shape.

7. The wiper assembly of claim 6, wherein the connector has side guide walls bridging lateral distances between the wiper rod and the first and second side walls of the connecting segment.

8. The wiper assembly of claim 1, wherein the connector is cast in one piece with a wiper rod.

9. The wiper assembly of claim 1, wherein the connector is molded onto a wiper rod.

10. The wiper assembly of claim 1, wherein the wiper arm is made of plastic and the connector is made in one piece with the wiper arm end.

11. The wiper assembly of claim 1, wherein the bracket is made of plastic.

12. The wiper assembly of claim 1, wherein the connecting segment of the bracket has a length only slightly larger than the wiper arm end fitted with the connector, so that the wiper arm end fitted with the connector can be introduced vertically into the connecting segment of the bracket.

13. The wiper assembly of claim 1, wherein an inside thread in the through-aperture of the connector and the corresponding thread of the screw have a large pitch.

14. The wiper assembly of claim 1, wherein the bearing segment of the screw has a front face creating the releasable frictional engagement in force-engaged contact with the second side wall.

15. A wiper assembly comprising:

a wiper bracket having a connecting segment for a pivoting connection with a wiper arm end, the connecting segment formed by a first side wall and a second side wall at a distance from and parallel to the first side wall;

a connector provided on a wiper arm and arranged in the connecting segment of the bracket between the two side walls to rotate relative to the bracket around a geometric axis running transverse to the two side walls and connected to the bracket, the connector having a through-aperture arranged coaxially with the geometric axis, the first side wall of the connecting segment having a first aperture coaxial with the geometric axis, and the second side wall of the connecting segment having a second aperture coaxial with the geometric axis, wherein the second aperture in the second side wall of the connecting segment is designed as a blind aperture and is closed on the outside of the second side wall; and a hinge pin arranged in the through-aperture of the connector in such a fashion that the bracket can be rotated about the geometric axis relative to the wiper arm.

* * * * *